United States Patent [19]
Li et al.

[11] Patent Number: 4,545,132
[45] Date of Patent: Oct. 8, 1985

[54] METHOD FOR STAGED COOLING OF PARTICULATE SOLIDS

[75] Inventors: Ying H. Li, Tucson, Ariz.; Bernard F. Bonnecaze, Littleton, Colo.

[73] Assignee: Atlantic Richfield Company, Los Angeles, Calif.

[21] Appl. No.: 597,319

[22] Filed: Apr. 6, 1984

[51] Int. Cl.⁴ .............................................. F26B 7/00
[52] U.S. Cl. ........................................ 34/20; 432/16
[58] Field of Search ............... 34/20; 432/15, 16, 17; 44/1 G, 10 J

[56] References Cited

U.S. PATENT DOCUMENTS

| | | | |
|---|---|---|---|
| 2,529,366 | 11/1950 | Bauer | 432/15 |
| 3,360,867 | 1/1968 | Sanderson | 432/15 |
| 3,672,069 | 6/1972 | Reh et al. | 34/20 |
| 4,249,909 | 2/1981 | Comolli | 44/1 G |

Primary Examiner—John J. Camby
Attorney, Agent, or Firm—F. Lindsey Scott

[57] ABSTRACT

An improved method for cooling particulate solids in an expanded bed by successively charging the particulate solids to a plurality of expanded beds with the exhaust gas from each of the plurality of expanded beds being discarded.

34 Claims, 3 Drawing Figures

METHOD FOR STAGED COOLING OF PARTICULATE SOLIDS

This invention relates to an improved method for cooling particulate solids in an expanded bed cooling zone.

This invention further relates to an improved method for cooling particulate solids by the use of a plurality of expanded beds.

This invention further relates to an improved method for cooling paticulate solids streams, such as dried lower rank coal, which contain a substantial portion of the total solids stream in the form of finely divided solids.

In recent years, there has been considerable interest in the use of alternate fuels as a substitute for petroleum or petroleum-derived products. One fuel which has been of considerable interest is lower rank coals such as brown coal, lignite, subbituminous coal and the like. Such coals are of considerable interest because typically they can be produced at a relatively low cost and typically they contain relatively low amounts of sulphur and ash. Unfortunately, such low rank coals as produced also frequently have a relatively high water content. Since such coals are frequently produced a substantial distance from the the site at which the coals are to be burned, the cost of transporting the water alone is considerable. Further, the presence of the water in the low rank coal results in a lower heat content per unit weight which renders such low rank coals less desirable for use in some existing boiler installations. Upon drying such low rank coals, a higher heat value per unit weight can be obtained and such dried low rank coals can be substituted for higher rank coal in some existing boiler installations.

A problem in the storage, transportation and use of such dried low rank coals is their tendency to spontaneously ignite. One technique which has been used to reduce the tendency of such dried low rank coals to spontaneously ignite is cooling. In other words, upon completion of the drying process, the dried low rank coal product is relatively reactive with respect to oxidation and begins to react with the oxygen in the air thereby increasing the temperature of the dried low rank coal. The increased temperature tends to result in an increased oxidation rate and eventually results in spontaneous ignition of the dried low rank coal. In other instances where the rate of oxidation of the dried low rank coal is slower, the reactivity of the dried low rank coal decreases as oxidation proceeds and no spontaneous ignition occurs. In essence, a race begins when the dried low rank coal is exposed to a free oxygen-containing atmosphere between the rise in temperature resulting from the oxidation of the coal and the reduction in the reactivity of the coal as a result of the partial oxidation of the coal surfaces with the outcome determining whether spontaneous ignition will occur.

The reactivity of the dried low rank coal can be reduced by reducing the temperature of the dried low rank coal. Accordingly, some processes for the production of dried low rank coal have included a cooling step in the process. U.S. Pat. No. 4,354,825 issued Oct. 19, 1982 to Fisher, et al. and U.S. Pat. No. 4,396,394 issued Aug. 2, 1983 to Li, et al. disclose processes of this type and are hereby incorporated in their entirety by reference. Both these processes include a cooler after the drying step.

Since it is desirable to cool the dried low rank coal product and since the value of the dried low rank coal product is relatively low, it is highly desirable that efficient and economical cooling processes be available.

According to the present invention, an improvement is achieved in processes for drying particulate solids, such as dried low rank coal, to a selected temperature in an expanded bed by an improvement comprising: successively charging the particulate solids to a plurality of expanded beds with the exhaust gas from each of the plurality of expanded beds being discarded. The total area of the plurality of expanded beds can be less than the bed area required in a single expanded bed for cooling the particulate solids to the selected temperature. The total amount of cooling gas required in the plurality of expanded beds can also be less than the amount of cooling gas required in a single expanded bed for cooling the particulate solids to the selected temperature.

In the discussion of the FIGURES, the same numbers will be used to refer to the same or similar components throughout.

Reference will be made to lines to include conveyors, conduits, pipes or the like as suitable for the transportation of solids, liquids or gases between various process vessels. As used in the discussion of the invention the term "expanded bed" is used to refer to fluidized beds, ebullated beds, semifluidized beds and the like.

Figure 1:
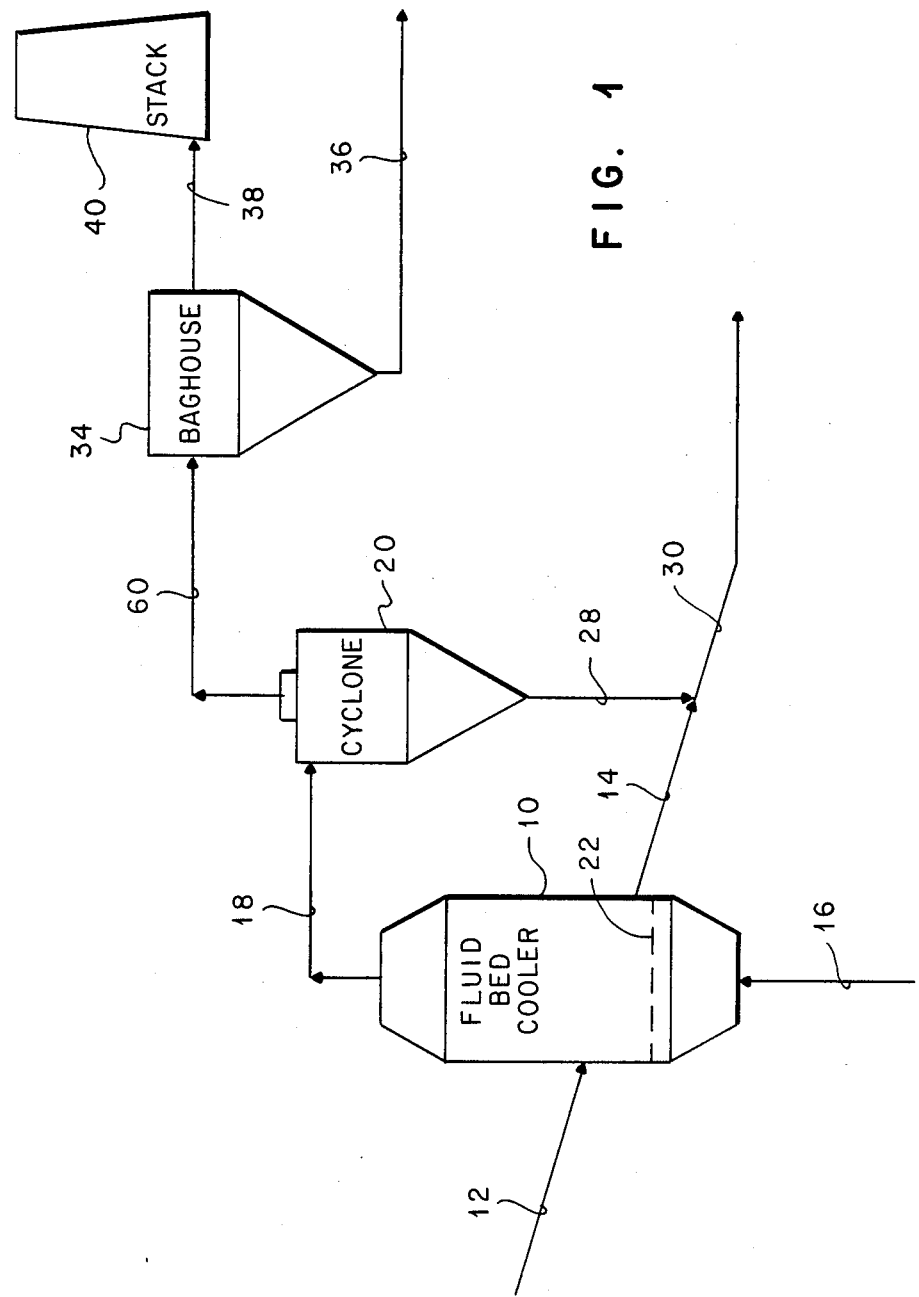
FIG. 1 is a schematic diagram of an expanded bed, solids cooling process including a single expanded bed cooler.

In FIG. 1, an expanded bed is maintained in a cooler 10 by passing a cooling gas, which is desirably air, upwardly through an expanded bed of particulate solids maintained above a support 22 in cooler 10. Support 22 may be a perforated plate, a bar grate, bubble caps, valve trays or the like as known to those skilled in the art for use in distributing gas flow and producing an expanded bed of particulate solids by the flow of gas upwardly through the support and the bed of expanded solids. Particulate solids are charged to vessel 10 through a line 12 with cooled particulate solids being recovered through a line 14. An exhaust gas stream comprising the cooling gas which has been heated to an increased temperature by heat exchange with the expanded bed of particulate solids in cooler 10 is recovered through a line 18 and passed to a cyclone 20 where entrained particulate solids are removed from the gaseous stream and passed through a line 28 to combination with the cooled particulate solids recovered from cooler 10 via line 14. The combined stream is recovered as a product through a line 30. The cleaned exhaust gas from cyclone 20 is passed through a line 60 to a baghouse 34 where finely divided particulate solids are removed and passed to use as a fuel or the like through a line 36 with the exhaust gas from baghouse 34 being discharged through a line 38 to a stack 40 or the like. The exhaust gas may in some instances require further treatment or clean-up prior to discharge to the atmosphere. Processes for the treatment of such exhaust gases are well known to those skilled in the art and do not comprise a part of the present invention.

Figure 2:
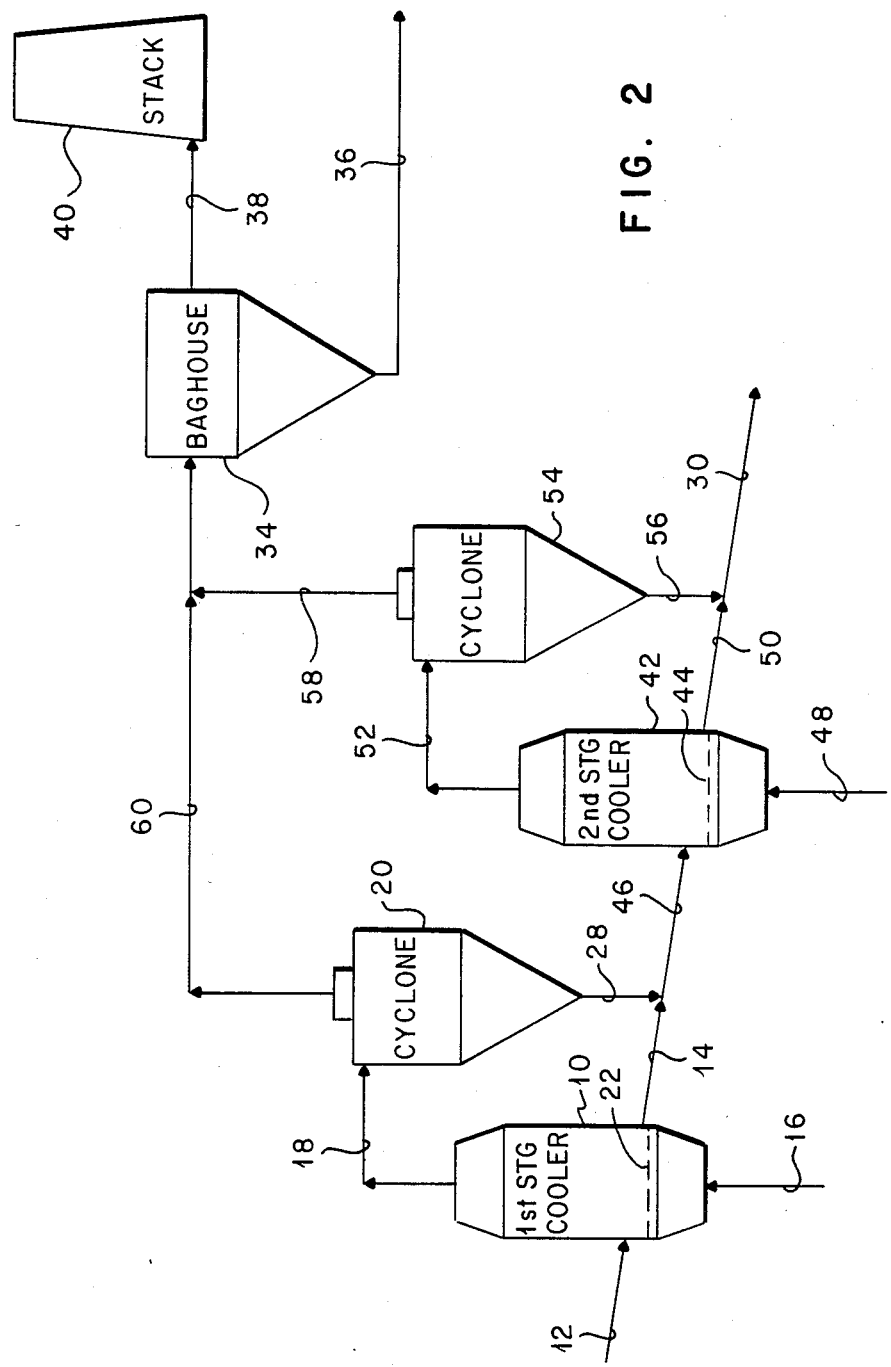
FIG. 2 is a schematic diagram of an expanded bed, solids cooling process including two expanded bed coolers; and, FIG. 3 is a schematic diagram of an expanded bed, solids cooling process including three expanded bed coolers.

In FIG. 2, a process is shown which includes two cooling vessels. The cooling vessels have a smaller combined expanded bed area than when a single cooler is used as in FIG. 1 for a comparable particulate solids feedstream. FIG. 2 will be discussed with respect to first stage cooler 10 as if a second stage cooler 42 had been added to the process shown in FIG. 1. Particulate solids are charged to second stage cooler 42 through a line 46 at a temperature below the inlet temperature to first stage cooler 10 but above the desired product temperature, and maintained as an expanded bed above a support 44 in second stage cooler 42. Support 44 may be a perforated plate, a bar grate, bubble caps, valve trays or other means known to the art for maintaining a bed of particulate solids in a fluidized condition. Cooling air supplied through a line 48 is passed upwardly through the expanded bed of particulate solids in second stage cooler 42 and an exhaust gas is recovered from second stage cooler 42 through a line 52. Cooled particulate solids are withdrawn from second stage cooler 42 through a line 50. Exhaust gas recovered through line 52 is passed to a cyclone 54 where entrained solids are removed and passed through a line 56 to combination with the cooled particulate solids recovered through line 50 with the combined stream being passed to product through line 30. The cleaned gas from cyclone 54 is passed through a line 58 to line 60 where it is combined with the exhaust gas from cyclone 20 and passed to baghouse 34. The treatment of the exhaust gas stream in baghouse 34 is as discussed in conjunction with FIG. 1.

Figure 3:
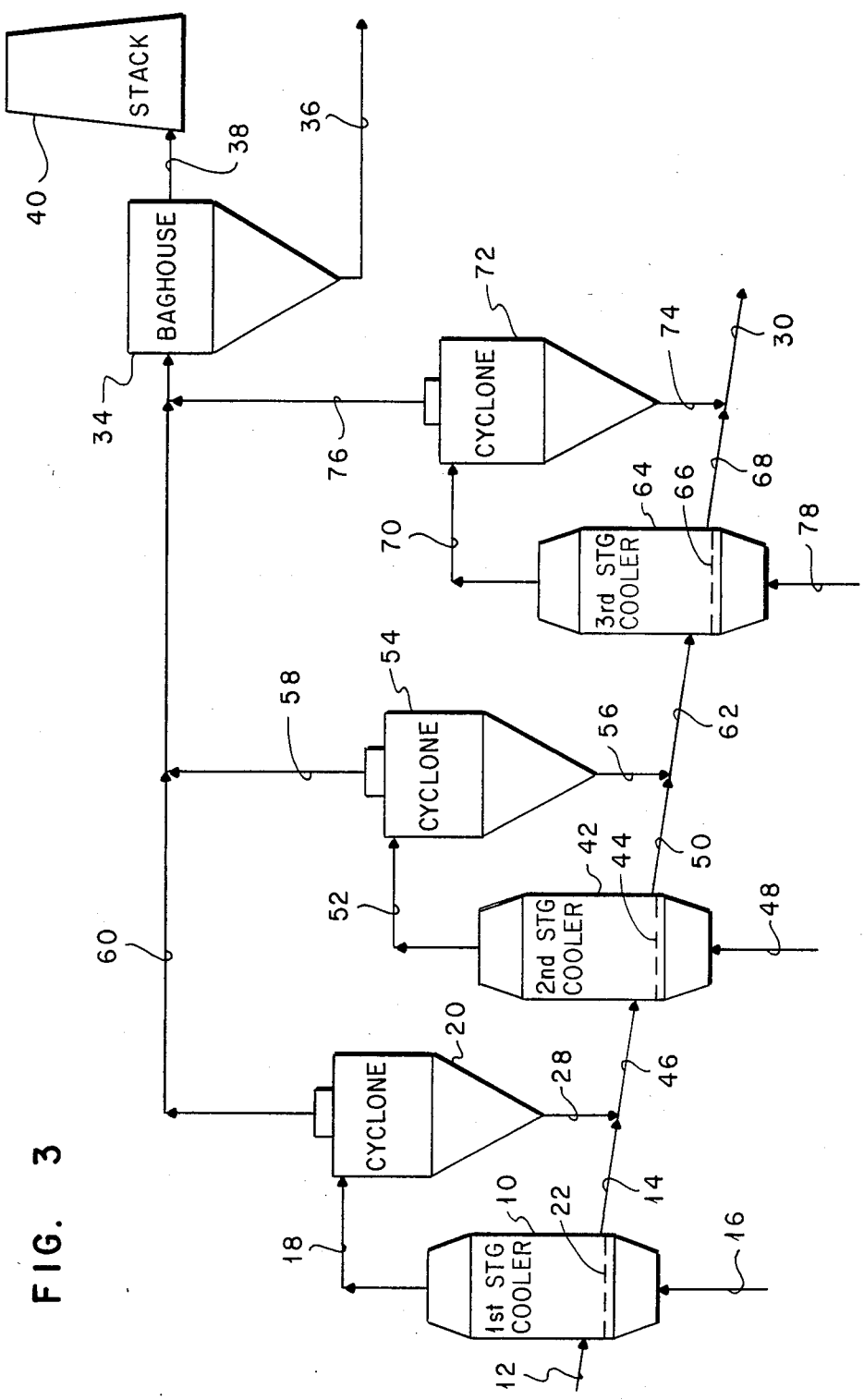

In FIG. 3, a process including three cooling vessels is shown. The expanded beds in first stage cooler 10, second stage cooler 42 and a third stage cooler 64 have a smaller total expanded bed area than cooler 10 and cooler 42 in FIG. 2 for a comparable particulate solids feed stream. The process in FIG. 3 will be discussed as if third stage cooler 64 had been added to the process shown in FIG. 2. The particulate solids charged to first stage cooler 10 through line 12 are at a higher temperature than the particulate solids charged to second stage cooler 42 through line 46 with the particulate solids charged to third stage cooler 64 through line 62 being at a lower temperature than the solids charged to second stage cooler 42 but still above the temperature desired in the product discharge stream in line 30. An expanded bed is maintained above a support 66 in third stage cooler 64 by the flow of cooling gas from a line 78 upwardly through the expanded bed with an exhaust gas stream being recovered through a line 70. Cooled particulate solids are withdrawn from the expanded bed in third stage cooler 64 through a line 68. Entrained particulate solids are removed from an exhaust gas stream 70 from third stage cooler 64 in a cyclone 72 with the recovered finely divided solids being passed through a line 74 to combination with the cooled particulate solids in line 68 to produce a discharge product stream which is recovered through a line 30. The exhaust gas from cyclone 72 is passed through a line 76 to combination with the exhaust gas from cyclone 20 and cyclone 54. The combined exhaust gas stream is treated in baghouse 34 as discussed in conjunction with FIG. 1.

In the use of a plurality of expanded beds in such processes, it has been found that when using a cooling gas of a given temperature, a smaller total expanded bed area is required and a reduced gas volume is required when a plurality of expanded beds are used.

EXAMPLES

In a study based on dried low rank coal cooling requirements for a 200 ton per hour commercial coal drying facility, the following computer simulations were developed. In Cases I, II, and III below, the hot coal feed to the cooling section was 144 tons per hour at 200° F. (94° C.) and 10.2 weight percent water. The equipment sizing was based on an inlet air temperature of 61° F. (16° C.). Single, double and triple stage fluid bed cooling was considered for producing an 80° F. (27° C.) product stream. The fluid bed depth in each expanded bed is 3 feet and the superficial gas velocity above the bed is limited to 18 feet per second. It was also assumed that each cooling stage was completely back mixed so that the material and heat balances were the basis for estimating air requirements.

Case I—Single Stage Cooling to 80° F. (27° C.)

The general flow arrangement is as shown in FIG. 1. A 3 foot deep fluidized bed of coal is maintained in cooler 10 by flowing 386,000 ACFM (actual cubic feet per minute—exhaust gas flow) of air upwardly through the fluidized bed. It has been assumed that the hot dried coal will lose 1.2 weight percent water during the cooling process so that the cooled dried coal will be discharged at 9 weight percent water. In this study, 50 percent of the coal is entrained with the cooler exhaust gases and is collected in cyclone 20. The entrained fine material will be at essentially the same temperature as the exhaust gases and since it is desired to cool all the coal to 80° F. (27° C.), the exhaust gas temperature was limited to 80° F. (27° C.). The various process parameters are shown in Tabel I.

Case II—Double Stage Cooling to 80° F. (27° C.)

The general flow arrangement is shown in FIG. 2. The areas of supports 22 and 44 are equal (113 ft² each). 243,000 ACFM of air (exhaust gas) is passed through the fluidized beds in first stage cooler 10 and second stage cooler 42. The air is equally divided between the two fluidized beds. The coal entering first stage cooler 10 is cooled to 106° F. (41° C.) and is then allowed to flow into second stage cooler 42 where it is cooled to the desired 80° F. (27° C.). As in Case I, 50 weight percent of coal is entrained with the exhaust gases from first stage cooler 10 and second stage cooler 42 to cyclones 20 and 54 respectively. In Case II, it has been assumed that the amount of coal moisture lost is the same as in Case I except that in Case II, 75 percent of the water is considered to evaporate in first stage cooler 10 and only 25 percent of the water in second stage cooler 42. The various process parameters for Case II are shown in Table I.

Case III—Triple Stage Cooling to 80° F. (27° C.)

The general flow arrangement is shown in FIG. 3. The areas of supports 22, 44 and 66 are equal (61 ft² each). The hot coal is cooled in three consecutive fluid bed coolers. The coal is cooled to 125° F. (52° C.) in first stage cooler 10, to 93° F. (34° C.), in second stage cooler 42, and to 80° F. (27° C.) in third stage cooler 64. 198,000 ACFM of air (exhaust gas) is required to maintain the fluidized beds in first stage cooler 10, second stage cooler 42, and third stage cooler 64. The air is divided equally among the three fluidized beds. Fifty percent of the coal is entrained from each bed, recovered in cyclones 20, 54 and 72 respectively and combined with the cooled coal in lines 14, 50 and 68 respectively. The remaining process parameters are shown in Table I. The water evaporation is assumed to be the same as for CASE II above.

In a further study based on dried low rank coal cooling requirements for a 200 ton per hour commercial coal drying facility, the following computer simulations were developed. In Cased IV and V below, the hot coal feed to the cooling section was 151.1 tons per hour at 239.4° F. (105° C.) and 10.2 weight percent water. The equipment sizing was based on an inlet air temperature of 65° F. (18° C.). Triple bed cooling (Case IV) and double bed cooling with chilled inlet air (Case V) were considered for producing an 80° F. (27° C.) product stream. The fluid bed depth in each expanded bed is three feet. The cooling gas inlet velocity and the exhaust gas velocity is as set forth in Table I. It is assumed that all—8 Tyler Mesh material is entrained from each bed and recovered via the cyclones at the temperature of the exhaust gas and recombined with the non-entrained solids. The combined solids are fed to the next stage cooler or recovered as product as appropriate.

Case IV—Triple Stage Cooling to 79.6° F. (27° C.)

The general flow arrangement is shown in FIG. 3. The areas of supports 22, 44 and 66 are equal (60 ft² each). The coal is cooled in first stage cooler 10 to a temperature of 145° F. (63° C.), in second stage cooler 42 to a temperature of 101.4° F. (38° C.) and in third stage cooler 64 to a temperature of 79.6° F. (27° C.). The water content of the coal is reduced in first stage cooler 10 to 9.97 wt %, in second stage cooler 42 to 9.52 wt % and in third stage cooler 64 to 9.26 wt %. The gas flow rates and other process conditions are shown in Table I.

Case V—Double Stage Cooling to 78.7° F. (26° C.) with Chilled Cooling Gas

The general flow arrangement is as shown in FIG. 2. The areas of supports 22 and 44 are equal (80 ft² each). The coal is chilled in first stage cooler 10 to a temperature of 129.7° F. (54.5° C.) and in second stage cooler 42 to a temperature of 78.7° F. (26° C.). The cooling gas used in second stage cooler 42 (line 48) is chilled to a temperature of 45° F. (7° C.) prior to charging the cooling gas to second stage cooler 42. The water content of the coal is reduced in first stage cooler 10 to 9.8 wt % and in second stage cooler 42 to 9.37 wt %. The remaining process conditions are set forth in Table I.

TABLE 1

|  | Case I Single-Stage Cooling | Case II Double-Stage Cooling | Case III Triple-Stage Cooling | Case IV Triple-Stage Cooling | Case V Double-Stage Cooling |
|---|---|---|---|---|---|
| Cooling gas temperature (°F.) | | | | | |
| first bed (line 16) | 61 | 61 | 61 | 65 | 65 |
| second bed (line 48) | | 61 | 61 | 65 | 45 |
| third bed (line 78) | | | 61 | 65 | |
| Exhaust gas temperature (°F.) | | | | | |
| first bed (line 18) | 80 | 106 | 125 | 141.6 | 131.3 |
| second bed (line 52) | | 80 | 93 | 99.0 | 77.7 |
| third bed (line 70) | | | 80 | 78.7 | |
| Combined exhaust gas temp. (°F.) | 80 | 92 | 100 | 106.8 | 104.5 |
| Inlet coal temperature (°F.) | | | | | |
| first bed (line 12) | 200 | 200 | 200 | 239.4 | 239.4 |
| second bed (line 46) | | 106 | 125 | 145.0 | 129.7 |
| third bed (line 62) | | | 93 | 101.4 | |
| Difference between combined cooler exhaust gas temperature of and inlet gas temperature (°F.) | 19 | 31 | 39 | 41.8 | 49.5* |
| Total cooler bed area (Ft.²) | 355 | (2 × 113) 226 | (3 × 61) 183 | (3 × 60) 180 | (2 × 80) 160 |
| Total cooler system exhaust (ACFM) | 386,472 | 243,000 | 197,860 | | |
| Cooler fan power (horsepower) | 3,032 | 1,862 | 1,518 | | |
| Baghouse cloth area (Ft.²) | 55,200 | 34,710 | 28,285 | | |
| Cooling gas flow rate (ft/sec) | | | | | |
| first bed (line 16) | | | | 16.8 | 16.8 |
| second bed (line 48) | | | | 16.8 | 16.8 |
| third bed (line 78) | | | | 16.8 | |
| Exhaust gas flow rate (ft/sec) | | | | | |
| first bed (line 18) | | | | 20.2 | 19.7 |
| second bed (line 52) | | | | 18.3 | 18.2 |
| third bed (line 70) | | | | 17.4 | |

*The average inlet temperature was used since the inlet gas temperature varies in Case V.

Dried low rank coal produced by expanded bed drying processes tends to contain relatively high amounts of finely divided particulate coal solids. As a result, a large portion of the total particulate solids stream is entrained in such processes and in expanded bed cooling systems used to cool such coal. As a result, the processes discussed above as Cases I, II, and III have been calculated using an assumed 50 weight percent entrainment of the particulate solids stream. When such entrainment occurs, equilibrium is quickly established between the entrained finely divided particulate solids and the exhaust gas so that the entrained particulate solids and the exhaust gas are exhausted at substantially the same temperature. When it is desired to produce a combined particulate solids stream at 80° F. (27° C.), it is necessary that the exhaust gas temperature be limited to a temperature such that when the entrained solids are combined with the non-entrained solids, the combined solids stream temperature is at or below 80° F. (27° C.). When plug flow is accomplished with solids streams which are not subject to the entrainment of fine solids from the fluidized bed, lower solids temperatures can be reached near the discharge side of the fluidized bed than exist in the combined exhaust gas in a single stage. To illustrate, if a particulate solids stream is charged to a fluidized bed at 100° F. (38° C.) and cooling gas at 60° F. (16° C.) is passed upwardly through the bed, the gases leaving the surface of the fluidized bed near the inlet will approximate 100° F. (38° C.) with the temperature of the gases above the fluidized bed steadily decreasing to the discharge temperature of the particulate solids near the outlet side of the fluidized bed. If the bed is long enough and if plug flow is accomplished, the temperature of the discharged solids could approach 60° F. (16° C.) even though the combined exhaust gas may have a temperature as high as 80° F. (27° C.). This is an oversimplification for illustration which probably does not occur to this extent in practice because of back mixing, etc. The situation, is radically changed by entrainment of a high proportion of the total particulate solids stream as is the case when cooling dried low rank coal. Since the entrained particulate coal solids reach equilibrium with the exhaust gas and are later combined with the particulate solids recovered from the expanded bed, it is clear that in order to reach a given temperature, the exhaust gas temperature must not exceed that the given temperature unless the non-entrained solids recovered from the expanded bed have been cooled below the given temperature. The net result is that substantially cocurrent heat exchange exists in such fluidized beds.

By the practice of the processes set forth in Cases I, II, and III above, it is clear that improved efficiency is accomplished by the use of a plurality of expanded beds. The total cooler expanded bed area has been decreased from 355 ft.$^2$ with a single expanded bed (Case I) to a value of 226 ft.$^2$ when two expanded beds are used (Case II) and to 183 ft.$^2$ when three expanded beds are used (Case III). The required gas volume is also reduced when using cooling gas of a comparable temperature. Please note that the difference between the combined cooler exhaust gas temperature and the cooling gas temperature in Cases I, II, and III steadily increases as additional stages are used. When a plurality of cooling stages are used, a higher combined cooler exhaust temperature can be achieved while still accomplishing the desired cooling with solids streams which include a high proportion of fine material which is entrained from the expanded bed and then added back to the non-entrained solids. The temperature of the exhaust gas from the last stage must be low enough so that when the entrained solids are combined with the non-entrained solids the combined temperature is at or below the desired temperature. This increase in the differential gas temperature is a factor in the surprising improvement in efficiency. By the use of multiple stages, a higher differential temperature can be obtained in the first expanded bed(s) with the narrower temperature differential required by the product temperature being a constraint only in the last expanded bed.

To some extent, the improvement of the present invention could be viewed as staging or compelling plug flow of the particulate solids through the various expanded beds. This alone does not account for the surprising improvement. Merely preventing back mixing of the solids does not accomplish the improvement found in Case II and Case III. A portion of the improvement is accomplished not only by preventing back mixing but by discarding the exhaust gas from the first stages at a temperature considerably in excess of the desired product particulate solids temperature. Exhaust gas temperatures in excess of the desired discharge particulate solids product temperature are not suitable in comparable single stage processes when substantial quantities of particulate solids are entrained in the exhaust gas if the entrained solids are to be combined with the non-entrained solids to produce the product stream unless the non-entrained solids have been cooled sufficiently below the desired product temperature so that the combined solids are at a temperature at or below the desired temperature. Such higher temperatures can be used when staging is used. It is clear then that the use of a plurality of expanded beds as discussed above results in a surprising and synergistic improvement in the efficiency of the particulate solids drying process.

While the process has been discussed with reference to particulate solids in general, it is suprisingly effective with particulate solids such as dried low rank coal which contain a very high proportion of finely divided particulate solids which are entrained at most suitable fluidizing cooling gas velocities. While the process is suitable for use with other particulate solids, it is considered to be particularly suitable for use in cooling dried particulate low rank coal.

Expanded beds as discussed herein may include fluidized beds, ebullated beds, semi-fluidized beds and the like. Expanded beds are known to those skilled in the art to comprise beds of particulate solids which have an apparent volume in excess of their settled volume because of the passage of air upwardly through the expanded bed. Such beds may be referred to by a variety of terms but all are basically expanded beds as discussed above.

While processes involving two and three expanded bed zones have been discussed, it is to be understood that additional cooling stages could be used if desired. Clearly, the added efficiency accomplished by the use of increased stages must be balanced against the economic considerations of the cost of constructing and operating such stages and the like. In some instances, it may be desirable to use more than three stages and in other instances it may be found that the optimum results are obtained with two stages. Further, the use of the method of the present invention contemplates the use of air which may be chilled by equipment such as evaporative coolers, refrigerative coolers and the like to produce cooling air of a desired temperature for use as a cooling gas to some or all of the expanded bed zones. A preferred method for using such chilled air is shown in Case V where air which has been chilled to 45° F. (7° C.) is used in a second cooling vessel. By comparison of Case IV (a three stage cooling process) with Case V (a two stage process using chilled air) it can be seen that a comparable coal stream is cooled to the same temperature in two stages when chilled air is used as is accomplished in three stages when no chilled air is used. The use of chilled air in the last of multi-stage coolers is very desirable since it greatly improves the process efficiency; and because of the reduced air volumes required to the individual expanded beds, a relatively small volume of air is required. Thus, the cooling equipment can be relatively small. Chilling may also be used intermittently if desired. In some instances it may be used only when the temperature of the ambient air exceeds a desired temperature. Desirably the chilled gas is cooled to a temperature at least 10° F. (5.5° C.) below the ambient air.

In some instances, it may be desirable to use the same expanded bed area and accomplish a greater cooling gas volume reduction than shown in Cases II and III above. Such is within the scope of the present invention. Similarly, it may be desirable to reduce the expanded bed area to a minimum with no reduction in the amount of cooling gas used. Such is also considered to be within the scope of the present invention.

While air is considered to be the preferred cooling gas, it is within the scope of the present invention to use other gases if such are available at a suitable temperature. In most instances, it is believed that substantial volumes of cooling gas will be necessary and that typically, ambient air will be used. In the event that it is desirable to use air or other gases with recycle of the cooling gas after cooling in a suitable heat exchanger or the like, the term "exhaust gas" as used above should be understood to refer to the gas leaving the cooling process prior to any cooling for recycle.

Having thus described the present invention by reference to its preferred embodiments, it is noted that the embodiments described are illustrative rather than limiting and that many variations and modifications are possible within the scope of the present invention. Many such variations and modifications may be considered obvious and desirable to those skilled in the art based upon a review of the foregoing examples and preferred embodiments.

Having thus described the invention, we claim:

1. In a method for cooling particulate solids including finely divided solids in an expanded bed of said solids, said expanded bed being supported above a support means in a cooling vessel by flowing a cooling gas upwardly through said expanded bed at a velocity sufficient to maintain said expanded bed in an expanded condition and for a time sufficient to cool said solids to a selected temperature, the improvement comprising: cooling said solids to said selected temperature by successively charging said solids to a plurality of expanded beds wherein finely divided solids are entrained from said plurality of expanded beds with the exhaust gas from each expanded bed and recovered and combined with the cooled solids recovered from said expanded bed and wherein the exhaust gas from each of said plurality of expanded beds is discarded, the total bed area of said plurality of expanded beds being less than the bed area required in a single expanded bed for cooling said solids to said selected temperature and the total amount of cooling gas required in said plurality of expanded beds being less than the amount of cooling gas required in a single expanded bed for cooling said solids to said selected temperature.

2. The improvement of claim 1 wherein said particulate solids are coal.

3. The improvement of claim 2 wherein said particulate solids are dried low rank coal.

4. The improvement of claim 1 wherein said entrained finely divided solids comprise up to about 60 weight percent of said particulate solids.

5. The improvement of claim 1 wherein two expanded beds are used.

6. The improvement of claim 5 wherein the temperature of the exhaust gas from the first of said two expanded beds is higher than said selected temperature.

7. The improvement of claim 5 wherein the temperature of the exhaust gas from said second of said two expanded beds is no higher than said selected temperature.

8. The improvement of claim 7 wherein the temperature of the combined exhaust gas from said first and said second expanded bed is higher than said selected temperature.

9. The improvement of claim 6 wherein the temperature of finely divided solids entrained in said exhaust gas from said first expanded bed is substantially the same as said temperature of said exhaust gas.

10. The improvement of claim 7 wherein the temperature of finely divided solids entrained in said exhaust gas from said second expanded bed is substantially the same as said temperature of said exhaust gas.

11. The improvement of claim 1 wherein three expanded beds are used.

12. The improvement of claim 1 wherein a chilled gas is used as the cooling gas in at least one of said expanded beds.

13. The improvement of claim 12 wherein said chilled gas is used in the last of said expanded beds.

14. The improvement of claim 13 wherein said chilled gas is cooled to a temperature at least 10° F. below the ambient air.

15. In a method for cooling particulate solids including finely divided solids in an expanded bed of said solids, said expanded bed being supported above a support means in a cooling vessel by flowing a cooling gas upwardly through said expanded bed at a velocity sufficient to maintain said expanded bed in an expanded condition and for a time sufficient to cool said solids to a selected temperature, the improvement comprising: cooling said solids to said selected temperature by successively charging said solids to a plurality of expanded beds wherein finely divided solids are entrained from said plurality of expanded beds with the exhaust gas from each expanded bed and recovered and combined with the cooled solids recovered from said expanded bed and wherein the exhaust gas from each of said plurality of expanded beds is discarded, the total bed area of said plurality of expanded beds being less than the bed area required in a single expanded bed for cooling said solids to said selected temperature.

16. The improvement of claim 15 wherein two expanded beds are used.

17. The improvement of claim 16 wherein three expanded beds are used.

18. In a method for cooling particulate solids including finely divided solids in an expanded bed of said solids, said expanded bed being supported above a support means in a cooling vessel by flowing a cooling gas upwardly through said expanded bed at a velocity sufficient to maintain said expanded bed in an expanded condition and for a time sufficient to cool said solids to a selected temperature, the improvement comprising: cooling said solids to said selected temperature by successively charging said solids to a plurality of expanded beds wherein finely divided solids are entrained from said plurality of expanded beds with the exhaust gas from each expanded bed and recovered and combined with the cooled solids recovered from said expanded bed and wherein the exhaust gas from each of said plurality of expanded beds is discarded, the total amount of cooling gas required in said plurality of expanded beds being less than the amount of cooling gas required in a single expanded bed for cooling said solids to said selected temperature.

19. The improvement of claim 18 wherein two expanded beds are used.

20. The improvement of claim 18 wherein three expanded beds are used.

21. A method for cooling particulate solids including finely divided solids to a selected temperature in an expanded bed, said method comprising:
  (a) successively charging said particulate solids to a plurality of expanded beds;
  (b) flowing cooling gas upwardly through each of said plurality of expanded beds at a velocity sufficient to maintain each of said expanded beds in an expanded condition above a support means and entrain finely divided solids from said plurality of expanded beds with the exhaust gas from each expanded bed and for a time sufficient to cool said particulate solids;
  (c) discharging an exhaust gas from each of said expanded beds;
  (d) recovering entrained finely divided solids from the exhaust gas from each of said expanded beds;
  (e) combining said recovered finely divided solids with the cooled solids recovered from said expanded bed; and,
  (f) recovering said combined cooled solids and finely divided solids from the last of said expanded beds at said selected temperature.

22. The method of claim 21 wherein said particulate solids are coal.

23. The method of claim 22 wherein said particulate solids are dried low rank coal.

24. The method of claim 21 wherein said entrained finely divided solids comprise up to about 60 weight percent of said particulate solids.

25. The method of claim 21 wherein two expanded beds are used.

26. The method of claim 25 wherein the temperature of the exhaust gas from the first of said two expanded beds is higher than said selected temperature.

27. The method of claim 25 wherein the temperature of the exhaust gas from said second of said two expanded beds is no higher than said selected temperature.

28. The method of claim 27 wherein the temperature of the combined exhaust gas from said first and said second expanded bed is higher than said selected temperature.

29. The method of claim 26 wherein the temperature of finely divided solids entrained in said exhaust gas from said first expanded bed is substantially the same as said temperature of said exhaust gas.

30. The method of claim 27 wherein the temperature of finely divided solids entrained in said exhaust gas from said second expanded bed is substantially the same as said temperature of said exhaust gas.

31. The method of claim 21 wherein three expanded beds are used.

32. The method of claim 21 wherein a chilled gas is used as the cooling gas in at least one of said expanded beds.

33. The method of claim 32 wherein said chilled gas is used in the last of said expanded beds.

34. The method of claim 33 wherein said chilled gas is cooled to a temperature at least 10° F. below the ambient air.

* * * * *